(12) United States Patent
Lin et al.

(10) Patent No.: US 10,465,025 B2
(45) Date of Patent: *Nov. 5, 2019

(54) LOW COMONOMER PROPYLENE-BASED IMPACT COPOLYMERS

(71) Applicant: ExxonMobil Chemical Patents Inc., Baytown, TX (US)

(72) Inventors: Chon-Yie Lin, Houston, TX (US); Todd S. Edwards, League City, TX (US); Christopher G. Bauch, Seabrook, TX (US); Prasadarao Meka, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,835

(22) Filed: May 31, 2017

(65) Prior Publication Data

US 2017/0267794 A1 Sep. 21, 2017

Related U.S. Application Data

(63) Continuation-in-part of application No. 15/061,015, filed on Mar. 4, 2016, now Pat. No. 9,745,395, which is a continuation of application No. 14/567,019, filed on Dec. 11, 2014, now Pat. No. 9,309,334.

(60) Provisional application No. 61/927,632, filed on Jan. 15, 2014.

(51) Int. Cl.
| | |
|---|---|
| *C08L 23/16* | (2006.01) |
| *C08L 23/14* | (2006.01) |
| *C08F 210/06* | (2006.01) |
| *C08F 10/06* | (2006.01) |
| *C08L 23/12* | (2006.01) |
| *C08K 3/34* | (2006.01) |
| *C08L 23/26* | (2006.01) |
| *C08K 3/013* | (2018.01) |

(52) U.S. Cl.
CPC ............ *C08F 210/06* (2013.01); *C08F 10/06* (2013.01); *C08K 3/013* (2018.01); *C08K 3/34* (2013.01); *C08L 23/12* (2013.01); *C08L 23/14* (2013.01); *C08L 23/26* (2013.01); *C08F 2500/04* (2013.01); *C08F 2500/11* (2013.01); *C08F 2500/12* (2013.01); *C08F 2500/17* (2013.01); *C08F 2500/24* (2013.01); *C08F 2800/20* (2013.01); *C08L 23/16* (2013.01); *C08L 2205/03* (2013.01); *C08L 2207/04* (2013.01)

(58) Field of Classification Search
CPC ...... C08L 23/12; C08L 23/16; C08L 2205/02; C08L 2207/02

See application file for complete search history.

(56) References Cited

U.S. PATENT DOCUMENTS

| | | | | |
|---|---|---|---|---|
| 4,948,841 | A * | 8/1990 | Kasahara | ............... C08L 23/12 525/240 |
| 5,258,464 | A | 11/1993 | McCullough, Jr. et al. | |
| 6,087,459 | A | 7/2000 | Miro et al. | |
| 6,384,142 | B1 * | 5/2002 | Burkhardt | ............. B01J 31/143 525/191 |
| 6,399,707 | B1 | 6/2002 | Meka et al. | |
| 6,660,808 | B2 | 12/2003 | Kim | |
| 6,759,475 | B2 | 7/2004 | Sakai et al. | |
| 6,777,497 | B2 | 8/2004 | Kanzaki et al. | |
| 7,309,742 | B2 | 12/2007 | Poncelet et al. | |
| 7,348,381 | B2 | 3/2008 | Bodiford et al. | |
| 7,445,827 | B2 | 11/2008 | Le et al. | |
| 7,449,522 | B2 | 11/2008 | Aguirre et al. | |
| 7,732,532 | B2 | 6/2010 | Tsunori et al. | |
| 7,772,324 | B2 * | 8/2010 | Massari | .................. C08F 10/00 525/191 |
| 7,872,074 | B2 * | 1/2011 | Massari | ............... C08F 210/06 525/191 |
| 7,893,171 | B2 | 2/2011 | Le et al. | |
| 7,935,766 | B2 | 5/2011 | Sheard et al. | |
| 7,977,435 | B2 | 7/2011 | Lin et al. | |
| 8,026,311 | B2 | 9/2011 | Migone et al. | |
| 8,044,135 | B2 | 10/2011 | Doufas et al. | |
| 8,067,510 | B2 | 11/2011 | Sheard et al. | |
| 8,207,272 | B2 | 6/2012 | Bernreitner et al. | |
| 8,445,598 | B2 | 5/2013 | Nenseth et al. | |
| 8,569,419 | B2 * | 10/2013 | Massari | ............. C08F 297/083 525/191 |
| 8,580,890 | B2 | 11/2013 | De Luca et al. | |
| 8,653,198 | B2 | 2/2014 | Leland | |
| 8,829,113 | B2 * | 9/2014 | Gaddi | ................... C08F 210/06 525/191 |
| 8,901,259 | B2 | 12/2014 | Bernreiter et al. | |
| 9,102,823 | B2 | 8/2015 | Leland | |
| 9,309,334 | B2 * | 4/2016 | Meka | ..................... C08F 10/06 |
| 9,416,238 | B2 | 8/2016 | Leland | |
| 9,416,262 | B2 | 8/2016 | Kock et al. | |
| 9,663,647 | B2 | 5/2017 | Van Egmond et al. | |
| 2001/0034411 | A1 | 10/2001 | Burkhardt et al. | |

(Continued)

FOREIGN PATENT DOCUMENTS

| | | |
|---|---|---|
| CN | 103360527 B | 3/2012 |
| CN | 104558816 B | 10/2013 |

(Continued)

*Primary Examiner* — Rip A Lee

(74) *Attorney, Agent, or Firm* — Kevin M. Faulkner

(57) ABSTRACT

A propylene-based impact copolymer having a high gloss and suitable for appliance components comprising a polypropylene homopolymer and within a range of from 6 wt % to 20 wt % of propylene copolymer based on the weight of the impact copolymer, wherein the copolymer comprises from 20 wt % to 44 wt % ethylene, and/or C4 to C10 α-olefin derived units and the remainder propylene-derived units based on the weight of the propylene copolymer, the impact copolymer having a melt flow rate (230° C./2.16 kg) within a range of from 10 g/10 min to 50 g/10 min.

33 Claims, 1 Drawing Sheet

(56) References Cited

U.S. PATENT DOCUMENTS

| | | | |
|---|---|---|---|
| 2004/0092631 A1 | 5/2004 | Joseph | |
| 2010/0016510 A1 | 1/2010 | Malm et al. | |
| 2010/0105848 A1 | 4/2010 | Meka et al. | |
| 2010/0280166 A1* | 11/2010 | Nenseth | C08F 210/16 524/528 |
| 2011/0207883 A1* | 8/2011 | Doufas | C08F 255/02 525/53 |
| 2012/0178883 A1* | 7/2012 | Massari | C08F 297/083 525/240 |
| 2014/0107274 A1* | 4/2014 | Salek | C08L 23/10 524/451 |

FOREIGN PATENT DOCUMENTS

| | | |
|---|---|---|
| CN | 102165006 B | 11/2013 |
| CN | 103360528 B | 9/2015 |
| WO | 1992/19653 A | 11/1992 |
| WO | 98/21275 A1 | 5/1998 |
| WO | 99/20663 A2 | 4/1999 |
| WO | 01/58970 A1 | 8/2001 |
| WO | 03/044086 A1 | 5/2003 |
| WO | 12/010678 A1 | 1/2012 |

\* cited by examiner

LOW COMONOMER PROPYLENE-BASED IMPACT COPOLYMERS

CROSS-REFERENCE TO RELATED APPLICATIONS

This is a Continuation-in-Part Application of U.S. Ser. No. 15/061,015 filed on Mar. 4, 2016, now issued as U.S. Pat. No. 9,745,395, which is a Continuation Application of U.S. Ser. No. 14/567,019, filed Dec. 11, 2014, now issued as U.S. Pat. No. 9,309,334, which claims priority to U.S. Ser. No. 61/927,632, filed Jan. 15, 2014, all of which are incorporated by reference.

FIELD OF THE DISCLOSURE

The present disclosure relates to polypropylene impact copolymers and in particular to polypropylene impact copolymers that have an overall low level of ethylene (or other α-olefin) comonomer present in the propylene copolymer for improved elongation.

BACKGROUND

Commercial polypropylene impact copolymers, industrially referred to as heterophasic copolymers, block copolymers, or simply as "impact copolymers" (ICPs), are typically made in at least two stages series reactors, and typically are "propylene-based" meaning that propylene-derived comonomers or monomers predominate in the ICP. Most ICP's comprise a homopolymer component made in the lead reactor and a copolymer component made in the second reactor to form an intimate polymer blend. The propylene monomer may be polymerized in slurry or gas phase process in the lead reactor. After the polymerization in the lead reactor, the porous polypropylene granules are stripped of the propylene monomer and transferred into a gas phase reactor where the propylene and ethylene comonomers are fed into the reactor to incorporate ethylene-propylene copolymer within the pores of the granules under fluidized conditions.

Because of the limitations of commercially available catalyst systems presently available to incorporate target amount of low ethylene content ethylene-propylene copolymers in the homopolymer granules, the physical properties that can be commercially achieved are also limited, in particular, in the Izod impact strength and elongation at break, etc.

This disclosure addresses the means to reliably and commercially manufacture propylene-based heterophasic copolymers that exhibit improved elongation at break, ductility, gloss and impact strength without compromising the stiffness (flexural modulus) of the resulting heterophasic copolymer by control of the copolymer content of the ICP, namely, at copolymer contents of greater than 10 or 15 or 20 wt % in the ICP. Also, the inventive ICP also improves the processability (or "flowability") of ICP granules in the transfer system from the polymerization stage to the finishing area to maintain the preferred production rate.

Related patents and publications include U.S. Pat. Nos. 8,207,272; 8,067,510; 8,044,135; 7,977,435; 7,935,766; 7,872,074; 7,772,324; 7,348,381; 7,309,742; 7,449,522; 6,660,808; 6,399,707; 6,384,142; 6,087,459; 5,258,464; US 2001/034411; US 2004/092631; US 2010/105848; WO 2012/010678; WO 2001/58970; WO 03/044086; WO 99/20663; and WO 98/21275.

SUMMARY

This disclosure is directed to a propylene-based impact copolymer (ICP) having high gloss and impact resistance comprising (or consisting essentially of, or consisting of) a polypropylene homopolymer and within a range of from 6 wt % to 20 wt % of propylene copolymer based on the weight of the ICP, wherein the copolymer comprises from 20 wt % to 44 wt % ethylene, 1-butene, 1-hexene and/or 1-octene derived units and from 80 to 56 wt % propylene-derived units (or, the remainder that is not comonomer-derived units) based on the weight of the propylene copolymer, the propylene-based impact copolymer having a Melt Flow Rate (MFR 230° C./2.16 kg) within a range of from 10 g/10 min to 50 g/10 min.

DETAILED DESCRIPTION

Figure 1:
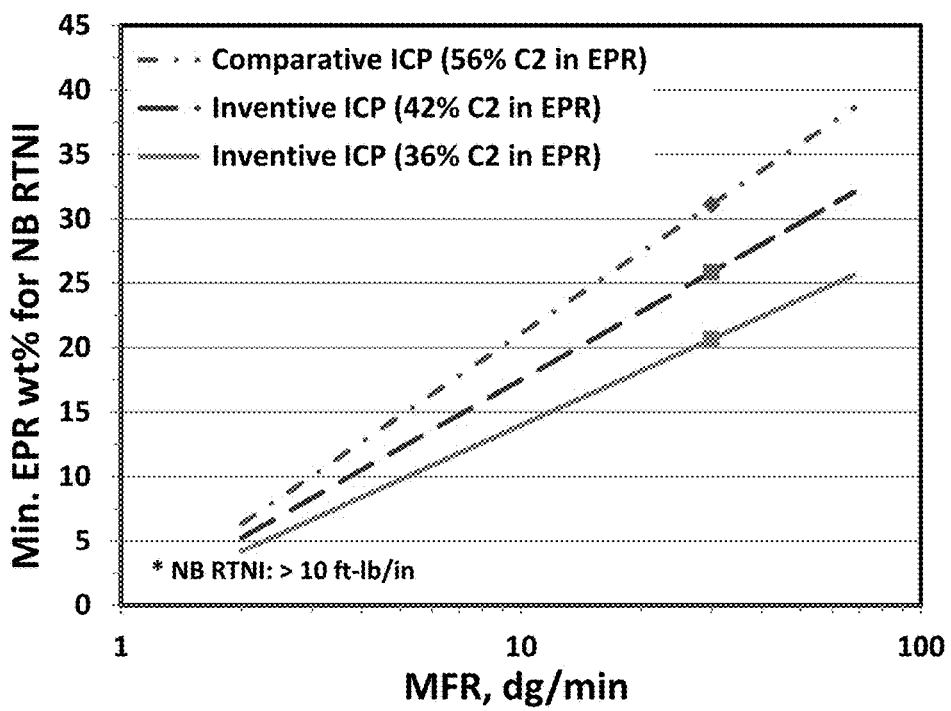
FIG. 1: Minimum ICP product copolymer content for No Break RTNI (notched Izod at 23° C.) as a function of ethylene-in-copolymer content and ICP MFR.

The present disclosure is directed to ICP's having a relatively low level of ethylene comonomer incorporation and low copolymer incorporation. This is unique because most catalyst systems used to produce the polypropylene component and copolymer components of ICPs tend to incorporate too large an amount of ethylene-derived units (or other comonomer) into the copolymer component. This occurs because most polyolefin catalysts, especially Ziegler-Natta catalysts that are titanium/magnesium based, tends to lose activity over time (the active metal center $Ti^{4+}$ changes to $Ti^{3+}$ with resident time in the reactor and the $Ti^{3+}$ site prefers to incorporate ethylene monomer over propylene monomer), thus, a very high incorporating catalyst is used to compensate for this. In addition, most catalyst systems are not able to produce ICP granules with a desirable flowability to prevent clogging in the subsequent polymerization-finishing transfer lines. The inventors have found that an ICP including a propylene copolymer having a relatively low ethylene or other comonomer (less than 45 wt % based on the copolymer) level increases the elongation, impact resistance and gloss of the ICP. A magnesium chloride supported titanium catalyst with one or more external donors described in U.S. Pat. No. 6,087,495 was used to produce the inventive ICP's. The improved ICP has a higher porosity in the homopolymer granules which allows for a higher content of the ethylene-propylene copolymer phase. The inventive propylene-based impact copolymer is suitable for applications such as interior trim automotive components in the neat form or as a compounding base to make thermoplastic olefin formulations used in the automotive industry such as instrument panel, bumper fascia, glove box bins, etc. The inventive ICP's are also useful in making appliances and other articles and components where both toughness and glossy appearance are important.

In any embodiment, the ICP's described herein are made by physically blending polypropylene homopolymer component(s) and propylene-copolymer component(s), or made in a single reactor process using dual catalysts to produce the different components, or are produced in a series reactor process to produce individual components that are further combined in situ, or in one or more of the reactors. Most preferably, the ICP's described herein are produced in series reactors wherein the polypropylene homopolymer is first produced in one or more slurry reactors by contacting a catalyst and monomers, preferably propylene, such as in slurry-loop reactors well known in the art, followed by combining the same catalyst and formed homopolymer in a single gas-phase reactor with monomers, preferably propylene and ethylene and/or C4 to C10 α-olefins, to produce the propylene copolymer such that the copolymer imbeds itself in the homopolymer as discrete domains with the homopolymer as a matrix or "continuous" phase. The MFR of the individual components can be controlled by, for example, addition and removal of hydrogen from the reactors. Most preferably, the homopolymer is produced in two loop-slurry reactors in series and each as a similar or same amount of hydrogen, producing homopolymer of nearly the same or the same MFR. The amount of hydrogen in the gas phase reactor may be the same or different from the loop slurry reactor, such level controlled by removing the hydrogen from the homopolymer stream entering the gas phase reactor or at some other stage. A suitable process and apparatus is described in U.S. Pat. No. 9,000,106 and U.S. Pat. No. 8,076,419 (column 6, line 6 to column 7, line 16). The systems and processes disclosed therein can be used in a "balanced" reactor scheme where two slurry loop reactors in series forming the polypropylene homopolymer are under the same or similar conditions, followed by transfer of the crystalline polymer (polypropylene homopolymer) to a single gas phase reactor to form the semi-crystalline polymer (propylene copolymer).

Thus in any embodiment is an ICP comprising a polypropylene homopolymer and within a range of from 10 or 15 or 20 or 22 or 24 wt % to 26 or 28 or 30 or 35 or 40 or 45 wt % of propylene copolymer based on the weight of the ICP, wherein the copolymer comprises from 20 or 25 or 28 or 30 wt % to 34 or 36 or 38 or 40 or 44 wt % ethylene, 1-butene, 1-hexene and/or 1-octene derived units and from 80 to 56 wt % propylene-derived units based on the weight of the propylene copolymer, the propylene-based impact copolymer having a MFR within a range of from 10 or 15 or 20 or 26 g/10 min to 30 or 36 or 40 or 50 g/10 min and an elongation at Break of greater than 60 or 70 or 80 or 90 or 100% (or within a range from 60 or 80% to 120 or 150 or 300 or 400%). Such an ICP tends to have high toughness, described more herein. Most preferably the propylene copolymer is an ethylene-propylene copolymer.

Also, in any embodiment is an ICP comprising a polypropylene homopolymer and within a range of from 6, or 8, or 10 wt % to 14, or 16, or 20 wt % of propylene copolymer based on the weight of the ICP, wherein the propylene copolymer comprises from 20, or 30 wt % to 44 wt % ethylene, 1-butene, 1-hexene and/or 1-octene derived units and from 80, or 70 to 56 wt % propylene-derived units based on the weight of the propylene copolymer, the ICP having a MFR within a range of from 5, or 8, or 12 g/10 min to 20, or 30, or 40, or 50 g/10 min. Such an ICP tends to have an improved gloss (G-ICP) compared to other ICP's, described more herein. Most preferably the propylene copolymer is an ethylene-propylene copolymer In any embodiment, the ICP has a molecular weight distribution (Mw/Mn) within a range from 4, or 5 to 7, or 8. In any embodiment the size exclusion chromatograph (SEC) chromatogram is unimodals, meaning there is only one discernable SEC maximum, which may or may not comprise a shoulder.

In any embodiment, the total comonomer derived unit content, preferably ethylene derived units of the ICP, is within a range from 2, or 2.5 wt % to 4, or 6, or 10, or 16 wt % by weight of the ICP.

In any embodiment, the melting point temperature of the ICP is greater than 155, or 160, or 162° C., or within a range from 155, or 160, or 162° C. to 170, or 180° C.

In any embodiment the polypropylene homopolymer portion of the ICP has an Mw/Mn within a range of from 3.0 or 3.5 or 4.0 to 4.5 or 5.0 or 6.0 or 7.0 or 8.0 or 9.0; and the polypropylene homopolymer portion also has an Mz/Mw of less than 4, or 3.4, or 3.2, or 3.0, or 2.8, or 2.6, or 2.4, or within a range from 2 to 2.5, or 2.6, or 2.8, or 3, or 3.2, or 3.4, or 4. By "polypropylene homopolymer" what is meant is a polymer comprising within a range of from 0 or 0.01 or 0.1 or 0.5 to 2.0 or 3.0 wt %, by weight of the polymer, of ethylene or C4 to C10 α-olefin-derived units, and most preferably refers to a polymer consisting of propylene-derived units. In any embodiment the "propylene copolymer" or "copolymer" is a polymer comprising ethylene, 1-butene, 1-hexene and/or 1-octene derived units, most preferably ethylene derived units.

In any embodiment the isopentad value for the polypropylene homopolymer is greater than 92, or 94, or 96%.

In any embodiment, in particular for an ICP with high gloss, the MFR of the polypropylene homopolymer is within a range from 5, or 10 g/10 min to 10, or 25, or 30, or 40 g/10 min. In embodiments for an impact copolymer with high toughness, the polypropylene homopolymer has a MFR within a range from 80, or 100 g/10 min to 120, or 140, or 160, or 180, or 200, or 220 g/10 min.

In any embodiment, the xylene cold soluble fraction of the ICP, which corresponds to the propylene copolymer portion of the ICP, has a number average molecular weight (Mn) within a range from 50,000, or 60,000 g/mole to 80,000, or 100,000 g/mole. In any embodiment, the propylene copolymer has a weight average molecular weight (Mw) within a range from 150,000, or 180,000, or 200,000 g/mole to 300,000, or 350,000, or 400,000 g/mole. And further, the propylene copolymer component has a z-average molecular weight (Mz) within a range from 400,000, or 450,000, or 500,000, or 550,000 g/mole to 650,000, or 700,000, or 800,000, or 900,000 g/mole.

In any embodiment the propylene copolymer portion of the ICP has an Mw/Mn within a range of from 3.0 or 3.5 or 4.0 to 4.5 or 5.0 or 6.0 or 7.0 or 8.0 or 9.0. The propylene copolymer component has an Mz/Mw of less than 4, or 3.4, or 3.2, or 3.0, or 2.8, or 2.6, or 2.4, or within a range from 2 to 2.5, or 2.6, or 2.8, or 3, or 3.2, or 3.4, or 4.

In any embodiment the propylene copolymer portion of the ICP has a melt flow rate within a range from 0.1, or 0.2 g/10 min to 0.6, or 0.8, or 1, or 2 g/10 min.

Also in any embodiment the propylene copolymer has an intrinsic viscosity (IV) within a range from 2, or 2.2 dL/g to 4, or 4.4, or 5, or 6 dL/g.

The inventive ICP is heterogeneous, meaning that there are domains of copolymer within a continuous phase of polypropylene homopolymer. Advantageously, the copolymer domains are relatively small, and the two domains are more miscible than prior art ICP heterogeneous domains. Thus, in preferred embodiments of the disclosure the polypropylene homopolymer forms a continuous phase and the copolymer, preferably an ethylene-propylene copolymer, forms copolymer domains having an average size (diameter) of less than 10, or 8, or 5, or 4, or 2 or 1 μm, or within a range of from 0.40 or 0.45 or 0.50 μm to 0.80 or 0.85 or 0.90, or 1, or 2, or 4, or 5, or 8, or 10 μm. Due to this nature of the inventive ICP, the surface of the solid material may have high gloss, and thus, the Gloss (60°) is within a range of from 35 or 40 to 85 or 90 (ASTM D523), or greater than 70, or 75, or 80, or 85% measured at any one of 20, 65, or 80 degrees.

The inventive ICP can desirably be made in a reactor in granules without further processing if desired. Thus, the impact copolymer in a preferred embodiment comprise reactor grade granules having an average particle size within a range of from 1200 or 1300 or 1400 or 1500 µm to 2000 or 2400 or 2800 µm and produced at a rate greater than 30,000 or 35,000 or 40,000 or 45,000 lbs/hr (13,620 kg/hr or 15,890 kg/hr or 18,160 kg/hr or 20,430 kg/hr). There are any number of ways of making the inventive ICP, but preferably it is manufactured in a two-step, sequential processes that utilizes a solution or slurry-type polymerization process in the presence of a polymerization catalyst, followed by transfer of the homopolymer-active catalyst to a gas phase reactor where it is further contacted with α-olefin comonomer and propylene to form the copolymer domains within the continuous phase of polypropylene homopolymer. Such processes, individually, are well known in the art, and described for instance in U.S. Pat. No. 8,076,419.

When manufacturing either the homopolymer or copolymer, the properties of each can be tailored to meet certain desired needs to impart desirable final properties in the inventive ICP, and there is a range of desirable properties that the inventive ICP can possess. For instance, the level of hydrogen in the reactor(s) can be adjusted, as can the polymerization temperature, residence time, identity of solvent (if any), as well as other factors.

In any embodiment the "tough" ICP (T-ICP) has a Heat Deflection Temperature (HDT) within a range of from 70 or 75 or 80 or 85° C. to 95 or 100 or 115 or 125° C.; or greater than 80 or 84 or 86 or 80 or 92° C. at 66 psi (ASTM D648). In any embodiment, the G-ICP has a HDT within a range of from 100 or 110° C. to 130, or 135, or 140, or 150° C.; or greater than 100, or 110° C. at 66 psi (ASTM D648).

Also, in any embodiment the ICP has a flexural modulus (1% Secant, ASTM D 790A) of greater than 200, or 220, or 250, or 300 kpsi, or within a range of from 120 or 130 or 140 kpsi to 200 or 225 or 250 or 300, or 400 kpsi. The tensile strength at yield of the inventive ICP is preferably within a range of from 2500 or 2600 psi to 3500 or 4500 or 5500 psi; or greater than 2800 or 2900 or 3000 or 3200 psi.

One advantage of the T-ICP is its desirable impact properties. For instance, the notched Izod impact at 23° C. as measured by ASTM D256A of the inventive ICP is preferably greater than 4 or 5 or 6 or 8 ft-lb/in (213 J/m or 267 J/m or 320 J/m or 426 J/m) (or within a range from 4 or 5 or 6 or 8 ft-lb/in to 10 or 12 or 14 ft-lb/in; 213 or 426 J/m to 533 or 640 or 693 J/m). Also, the notched Izod impact at 23° C. as measured by ISO 180/A is preferably greater than 8 or 10 or 12 or 14 or 20 kJ/m$^2$ (or within a range of from 8 or 10 kJ/m$^2$ to 16 or 20 or 30 or 40 or 50 or 60 kJ/m$^2$).

The disclosure described herein includes compositions of the ICP with other polymeric materials and common additives. Desirable polymeric materials include polypropylene homopolymers (as defined above), propylene-based elastomers (such as Vistamaxx™ propylene-based elastomers), ethylene-based plastomers, elastomers such as EP rubber, EPDM, butyl rubber, styrenic copolymers and block copolymers, and other impact copolymers, especially so called "high-comonomer" impact copolymers, which are defined as propylene-based impact copolymers having greater than 44 wt % comonomer-derived units in the copolymer portion. Common "additives" include fillers such as talc, carbon black, clay, silica, fatty acids, and other well-known materials, as well as antioxidants, anti-slip agents, pigments, cavitating agents (e.g., calcium carbonate), nucleating agents, curatives for added polymers that are curable, and any other of one or more well-known additives. These polymeric materials and additives may be compounded with the inventive ICP by traditional blending such as in a Brabender mixer, or extruded in a single or double screw extruder, and can possibly be formed in to a thermoplastic vulcanizate as is well known in the art.

In one embodiment, the inventive composition is a composition that is suitable for an exterior automotive component (car, truck, boat, etc.) comprising (or consisting essentially of) within a range from 10 or 20 or 30 wt % to 40 or 50 wt % of a high-comonomer impact copolymer, and within a range of from 5 or 10 or 15 wt % to 20 or 25 or 30 wt % of an ethylene-based plastomer, and within a range of from 20 or 25 or 30 wt % to 60 or 70 or 80 wt % of the propylene-based impact copolymer, wherein the weight percentages are based on the total weight of the composition. In a preferred embodiment, the composition would also include within a range of from 6 or 10 or 14 wt % to 18 or 22 or 30 wt % filler, most preferably talc, by weight of the composition.

As used herein "consisting essentially of" means that the described/claimed composition does not include any other components that will materially alter its properties by any more than 5% of that property, and in any case, does not include any other component to a level greater than 3 wt %.

Such exterior automotive compositions would have a wide range of desirable properties depending on the level of inventive ICP and other components added. In a preferred embodiment of the disclosure the composition has a notched Izod impact at 23° C. as measured by ISO 180/A of at least 48 or 50 or 52 kJ/m$^2$ at 23° C. (or within a range of from 48 or 50 to 52 or 60 kJ/m$^2$); and a notched Izod impact of at least 4 or 6 or 8 at −30° C. (or within a range of from 2 or 4 kJ/m$^2$ to 10 or 16 kJ/m$^2$). The elongation properties may vary widely, and preferably the inventive composition for exterior automotive components has an elongation at break (ISO 527) of at least 70 or 80 or 100 or 200%, or within a range of from 70 or 100% to 200 or 300 or 400 or 500%. Finally, the modulus of the exterior automotive compositions may also vary widely, and preferably have a flexural modulus (Chord, ISO 178) of at least 200 or 300 or 500 or 1000 or 1500 MPa, or within a range of from 600 or 800 MPa to 1500 or 2000 or 2500 MPa.

Another embodiment of the inventive composition is a composition that is suitable for interior automotive components comprising (or consisting essentially of) within a range of from 2 or 4 or 8 wt % to 14 or 18 or 25 wt % of an ethylene-based plastomer, within a range of from 2 or 4 or 8 wt % to 14 or 18 or 25 wt % of a high-comonomer impact copolymer, and within a range of from 70 or 75 or 80 or 85 wt % to 90 or 95 or 98 wt % of the propylene-based impact copolymer, wherein the weight percentages are based on the total weight of the composition. In a preferred embodiment of the disclosure, the composition would also include within a range of from 0.5 or 1.0 wt % to 2.0 or 2.5 or 3.0 or 6.0 wt % talc by weight of the composition.

As with the exterior automotive component composition, the interior automotive compositions would have a wide range of desirable properties depending on the level of inventive ICP and other components added. In a preferred embodiment of the disclosure the composition has a notched Izod impact at 23° C. as measured by ISO 180/A of at least 48 or 50 or 52 kJ/m$^2$ at 23° C. (or within a range of from 48 or 50 to 52 or 60 kJ/m$^2$); and a notched Izod impact of at least 4 or 6 or 8 at −30° C. (or within a range of from 2 or 4 kJ/m$^2$ to 10 or 16 kJ/m$^2$). The elongation at break (ISO 527) of the inventive interior composition is preferably at least 60 or 70 or 80 or 100 or 200 or 400 or 600 or 800%, or within a range of from 60 or 70% to 100 or 200 or 400 or 600 or 800 or 1000%. Also, the interior automotive composition would desirably have a flexural modulus (Chord, ISO 178) of at least 500 or 700 or 800 MPa, or within a range of from 500 or 700 MPa to 1000 or 1500 or 2000 MPa.

The inventive ICP's are also useful in appliances, having a glossy appearance desirable in appliance components as quantified in a measured a gloss value of greater than 70, or 75, or 80, or 85 measured at 20, 65, or 80 degrees. For instance the inventive ICP's are useful in washing machine components, refrigerator components, electronic articles (e.g., stereos, radios, lap-top computers, desk-top computers, hand-held devices, etc.), mixing devices, and other tools and domestic wear. More particular uses of the G-ICP include washing machine lids, control panel, vacuum cleaner components, water dispenser panels, window air conditioning casing, and refrigerator door buckets and bins. Such ICP's may also be combined with colorants, fillers and/or other polymers such as propylene-based elastomers, other impact copolymers, or ethylene-based plastomers, any of which may individually be present from 5 wt % to 20, or 30 wt %, by weight of all the components. Most preferably the G-ICP is blended only with colorants, antioxidants, and other minor additives to less than 4, or 2 wt % by weight of the components.

The various descriptive elements and numerical ranges disclosed herein for the ICP's and compositions including the inventive ICP's can be combined with other descriptive elements and numerical ranges to describe the disclosure; further, for a given element, any upper numerical limit can be combined with any lower numerical limit described herein. The features of the disclosure are demonstrated in the following non-limiting examples.

EXAMPLES

Melt Flow Rate (MFR): MFR was measured as per ASTM D1238, condition L or ISO 1133B at 230° C. and 2.16 kg load using a melt indexer. The "Melt Index", such as for the plastomer in the compositions, is tested similarly at 190° C.

Flexural modulus: The flexural modulus was measured according to ASTM D790, using a crosshead speed of 1.27 mm/min, and a support span of 50 mm using an Instron machine. The flexural modulus chord was measured as per ISO 178 test method, at a cross-head speed of 2 mm/min and 64 mm support span using an Instron machine.

Tensile Strength: The tensile strength at yield, elongation at yield and elongation at break were measured as per ASTM D638 or ISO 527, with a crosshead speed of 50 mm/min, using an Instron Machine.

Notched Izod impact strength: The Notched Izod impact strength was measured as per ASTM D256 or ISO 180-1/1 eA, using equipment made by Empire Technologies Inc.

Heat deflection Temperature (HDT): The HDT was measured according to ASTM D648 or ISO 75, using a load of 0.45 MPa or 1.8 MPa.

Gardner Impact strength: The Gardner impact strength at −29° C. was measured as per ASTM D5420 on a 3.2 mm thickness and 89 mm diameter round disk.

Instrumented Impact Testing: The total energy absorbed under instrumented impact conditions were run as per ASTM D3763 on a 3.2 mm thickness and 102 mm diameter round disk, using either at 5 or 15 mph test speed.

Gloss: The gloss was measured as per ASTM D523 on a 3.2 mm thickness and 89 mm diameter round disk using a glossimeter.

Rockwell Hardness: The Rockwell Hardness was measured as per ASTM D785 on a 3.2 mm thickness and 89 mm diameter round disk.

Isopentads: $^{13}$C Nuclear Magnetic Resonance. Characterization by NMR is accomplished as described in Polymer Sequence Determination by $^{13}$C NMR Method, by J. C. Randall (1977). The instrument used is a Bruker 600 MHz with a cryoprobe, calibrated using a mixture of 1,2,4-Trichlorobenzene and deuterobenzene. NMR data of the olefin block copolymer were measured by dissolving 200±1 mg of sample in 3 ml of d-solvent. The samples are dissolved in TCE-d2 in 10 mm NMR tube at 120° C. until the sample was dissolved. $^{13}$C NMR spectra references the polypropylene peak at 21.83 ppm or the solvent peak at 74.3 ppm depending on the tacticity of the sample.

Melting Point Temperature: Melting point temperature ($T_m$) and crystallization temperature (Tc) was measured using Differential Scanning calorimetry (DSC) using commercially available equipment such as a TA Instruments 2920 DSC. The method was as follows. From 6 to 10 mg of a sheet of the polypropylene polymer is pressed at approximately 200° C. to 230° C. and is removed with a punch die. The sample is sealed in an aluminum pan and loaded into the differential scanning calorimeter (Perkin Elmer 7 Series Thermal Analysis System) at room temperature. The sample is then heated at a rate of 10° C./min to a final temperature of 200° C. and is then held for 10 minutes at this temperature to destroy its thermal history. Crystallization data is acquired by cooling the sample from the melt to at least 50° C. below the crystallization temperature at a cooling rate of 10° C./min. The sample is then held for 10 minutes and finally heated at 10° C./min to acquire melting data (second heat). This provides information about the melting behavior after a controlled thermal history and free from potential molded-in orientation and stress effects. The endothermic melting transition and exothermic crystallization transition are analyzed for onset of transition and peak temperature. The melting temperature reported in the tables are the peak melting temperatures from the second heat unless otherwise indicated.

Intrinsic Viscosity (IV): The intrinsic viscosity (IV) values were measured according to ISO 1628-3:2010.

Molecular Weight Determinations: Given that polymers are a collection of individual molecules each having its own molecular weight, the expression of the molecular weight of the collective "polymer" takes several statistical forms. The number average molecular weight (Mn) of the polymer is given by the equation $\Sigma n_i M_i / \Sigma n_i$, where "M" is the molecular weight of each polymer "i". The weight average molecular weight (Mw), z-average molecular weight (Mz), and Mz+1 value are given by the equation $\Sigma n_i M_i^{n+1} / \Sigma n_i M_i^n$, where for Mw, n=1, for Mz, n=2, and for Mz+1, n=3, where $n_i$ in the foregoing equations is the number fraction of molecules of molecular weight $M_i$. Reported and claimed values for Mn are ±2 kg/mole, for Mw are ±5 kg/mole, and for Mz are ±50 kg/mole. The expression "Mw/Mn" is the ratio of the weight average molecular weight (Mw) to the number average molecular weight (Mn), while the "Mz/Mw" is the ratio of the Mw to the Mz, an indication of the amount of high molecular weight component to the polypropylene.

The Mw, Mn and Mz values for the ICP's were determined using size exclusion chromatography. Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 µm glass pre-filter and subsequently through a 0.1 µm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples. As used herein, the term "room temperature" is used to refer to the temperature of about 23° C.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering:

$$[K_O c/\Delta R(\theta,c)] = [1/MP(\theta)] + 2A_2 c$$

where $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules:

$$x_i = N_i / \Sigma N_i$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the following equation:

$$\eta_S = c[\eta] + 0.3(c[\eta])^2$$

where c was determined from the DRI output.

The polypropylene resin was produced in a bulk continuous pilot scale reactor. Magnesium chloride supported titanium catalysts were supplied by Toho Titanium Company, and the catalyst solid was used with an external donor described in U.S. Pat. No. 6,087,495. The donor system was a blend of dicyclopentyl dimethoxy silane and propyl triethoxy silane. Catalyst preparation was carried out continuously in situ by contacting the catalyst solids, triethylaluminum, and the donor system under conditions known in the art to yield active, stereospecific catalyst for polymerization of propylene. The activated catalyst was continuously fed to a prepolymerization reactor where it was continuously polymerized in propylene to a productivity of approximately 100 to 400 g-polymer/g-cat. The prepolymerized catalyst was then continuously fed to a bulk slurry reactor, and polymerization continued at 70° C. to 80° C., for a residence time of about 110 minutes. Hydrogen was used in the reactor to control the melt flow rate of the polypropylene homopolymer resin.

The reaction slurry (homopolymer granules in bulk propylene) was removed from the reactor and the homopolymer granules were continuously separated from the liquid propylene. The homopolymer granules were separated from the unreacted monomer and fed into a gas phase.

The granules from the bulk reactor, after removing the monomer, are fed to a gas phase reactor (GPR) where polymerization continued under conditions known in the art to produce ethylene-propylene copolymer within the interstitial pores of the homopolymer granules. The catalyst activity in the gas phase reactor was controlled by both an anti-static agent and a catalyst surface poisoning agents to control the composition of the ethylene-propylene copolymer. The final product, referred to in the art as an "impact copolymer," was continuously withdrawn from the gas phase reactor and separated from unreacted monomer to produce a granular product for compounding and mechanical property testing. The molecular weight of the ethylene-propylene copolymer or more appropriately, Intrinsic Viscosity (IV) of the rubber phase was controlled by the concentration of hydrogen in the gas phase reactor.

The copolymer granules thus obtained are stabilized with 0.15 wt % Irganox™ 1010, 0.05 wt % Ultranox™ 626A, and 0.10 wt % sodium benzoate (fine form), then pelletized on a 30 mm Werner & Pfleiderer twin screw extruder. The pellets were injection molded into ASTM test specimens using a 120 ton Van Dorn injection molding machine and ISO test specimens using a 110 ton Van Dorn injection molding machine. The physical properties were tested, respectively, as per ASTM and ISO guidelines. Test results of Examples 1-6 are in Tables 1 to 4. In the Tables, the "IV ratio" is the Intrinsic Viscosity ratio and is the IV of the ethylene-propylene copolymer phase/IV of the homopolymer phase.

For the compounded products, Examples 7, 8 and 9 in Tables 6-8, the base ICP resins were compounded in a second step by melt blending with additional and different impact copolymer, plastomer, talc and other additive components in a twin screw extruder and pelletized. The pellets were injection molded into ISO or ASTM test specimens for physical properties. These examples are suitable for interior automotive components.

Examples 3, 4 and 5 are the most preferred embodiments of the inventive ICP.

TABLE 1

| ICP and its Properties | | | |
|---|---|---|---|
| | Test Method | Example 1 | Example 2 |
| Resin Properties | | | |
| Melt Flow Rate (230° C./2.16 kg) | D 1238 | 29 | 30 |
| Ethylene-propylene copolymer (wt %) | | 26.0 | 27.3 |
| Ethylene in the Ethylene-propylene copolymer (wt %) | | 45.4 | 42.9 |
| IV Ratio | | 3.1 | 3.2 |
| Mechanical | | | |
| tensile strength at yield (psi) | D 638 | 2944 | 2893 |
| Elongation at Yield (%) | D 638 | 5.3 | 5.6 |
| Elongation at Break (%) | D 638 | 65 | 67 |
| tensile strength at yield (MPa) 50 mm/min | ISO 527 | 19 | 19 |
| Tensile Strength at Ultimate (MPa) 50 mm/min | ISO 527 | 14 | 14 |
| Elongation at Yield (%) 50 mm/min | ISO 527 | 5 | 5 |
| Elongation at Break (%) 50 mm/min | ISO 527 | 58 | 69 |
| flexural modulus, 1% Secant (kpsi) | D 790A | 150 | 145 |
| flexural modulus, 1% Secant (kpsi) | D 790B | 168 | 162 |
| flexural modulus, Chord (MPa) 2 mm/min | ISO 178 | 1042 | 1029 |
| Rockwell Hardness (R-Scale) | D 785 | 80 | 77 |
| Heat Deflection Temperature at 66 psi (° C.) | D 648 | 96 | 94 |
| Gloss | D 523 | | |
| at 60° | | 67 | 69 |
| Impact | | | |
| notched Izod impact (ft-lb/in) | D 256A | | |
| at 23° C. | | 12.1 | 12.4 |
| at −18° C. | | 2.0 | 2.1 |
| notched Izod impact (kJ/m$^2$) | ISO 180/A | | |
| at 23° C. | | 48 | 48 |
| at −20° C. | | 8.6 | 8.5 |
| at −40° C. | | 6.6 | 6.7 |
| Notched Charpy Impact (kJ/m$^2$) | ISO 179-1/1eA | | |
| at 23° C. | | 23 | 20 |
| at −20° C. | | 10.2 | 10.1 |
| at −40° C. | | 7.8 | 7.0 |
| Gardner Impact Strength 0.125 in thick disk at −29° C. (in-lb) | D 5420 | >320 | 301 |
| Instrumented Impact (ft-lb) | ASTM D3763 | | |
| 6.6 m/s (15 mph/25 lb) at 23° C. | | 26.4 (10D) | 26 (10D) |
| 6.6 m/s (15 mph/25 lb) at −20° C. | | 33.1 (6D, 4DB) | 34.1 (9D, 1DB) |
| 6.6 m/s (15 mph/25 lb) at −30° C. | | 30.8 (5D, 5DB) | 32.6 (5D, 3DB, 1BD, 1B) |

Failure Modes
D: Ductile;
DB: Ductile-Brittle;
BD: Brittle-Ductile;
B: Brittle

TABLE 2

ICP and its Properties

| | Example 3 | Example 4 | Example 5 |
|---|---|---|---|
| Resin Properties | | | |
| Melt Flow Rate (230° C./2.16 kg) | 30 | 31 | 34 |
| Ethylene-propylene copolymer (wt %) | 25.5 | 27.4 | 26.5 |
| Ethylene in ethylene-propylene copolymer (wt %) | 39.4 | 32.5 | 30.1 |
| IV Ratio | 3.6 | 3.1 | 3.0 |
| Mechanical | | | |
| tensile strength at yield (psi) | 3124 | 3020 | 3131 |
| Elongation at Yield (%) | 5.5 | 7.0 | 7.5 |
| Elongation at Break (%) | 79 | 127 | 193 |
| tensile strength at yield (MPa) 50 mm/min | 22 | 22 | 21 |
| Tensile Strength at Ultimate (MPa) 50 mm/min | 16 | 16 | 16 |
| Elongation at Yield (%) 50 mm/min | 4 | 6 | 6 |
| Elongation at Break (%) 50 mm/min | 79 | 237 | 319 |
| flexural modulus, 1% Secant (kpsi) | 156 | 149 | 144 |
| flexural modulus, 1% Secant (kpsi) | 177 | 162 | 163 |
| flexural modulus, Chord (MPa) 2 mm/min | 1053 | 1045 | 1019 |
| Rockwell Hardness (R-Scale) | 71 | 64 | 66 |
| Heat Deflection Temperature at 66 psi (° C.) | 91 | 90 | 89 |
| Gloss | | | |
| at 60° | 67 | 84 | 87 |
| Impact | | | |
| notched Izod impact (ft-lb/in) | | | |
| at 23° C. | 11.1 | 11.6 | 10.7 |
| at −18° C. | 1.7 | 1.7 | 1.3 |
| notched Izod impact (kJ/m$^2$) | | | |
| at 23° C. | 23 | 42 | 44 |
| at −20° C. | 8.2 | 6.8 | 8.0 |
| at −40° C. | 7.8 | 5.4 | 6.7 |
| Notched Charpy Impact (kJ/m$^2$) | | | |
| at 23° C. | 20 | 26 | 47 |
| at −20° C. | 9.7 | 7.3 | 7.8 |
| at −40° C. | 6.4 | 3.5 | 5.7 |
| Gardner Impact Strength 0.125 in thick disk at −29° C. (in-lb) | 251 | 258 | 243 |
| Instrumented Impact (ft-lb) | | | |
| 6.6 m/s (15 mph/25 lb) at 23° C. | 27.5 (10D) | 27.4 (10D) | 27.1 (10D) |
| 6.6 m/s (15 mph/25 lb) at −20° C. | 28.3 (2D, 7DB, 1BD) | 31.2 (10D) | 30.6 (6D, 1DB, 3BD) |
| 6.6 m/s (15 mph/25 lb) at −30° C. | 30.5 (10DB) | 20.3 (5D, 4DB, 1BD) | 27.2 (3D, 5DB, 1BD) |

Failure Modes
D: Ductile;
DB: Ductile-Brittle;
BD: Brittle-Ductile;
B: Brittle

TABLE 3

ICP and its Properties

| | Comparative Example 1 |
|---|---|
| Resin Properties | |
| Melt Flow Rate (230° C./2.16 kg) | 30 |
| Ethylene-propylene rubber (wt %) | 26.2 |
| Ethylene in ethylene-propylene copolymer (wt %) | 57.5 |
| IV Ratio | 3.1 |
| Mechanical | |
| tensile strength at yield (psi) | 2930 |
| Elongation at Yield (%) | 4.0 |
| Elongation at Break (%) | 19 |
| tensile strength at yield (MPa) 50 mm/min | 18 |
| Tensile Strength at Ultimate (MPa) 50 mm/min | 16 |
| Elongation at Yield (%) 50 mm/min | 3 |
| Elongation at Break (%) 50 mm/min | 9 |
| flexural modulus, 1% Secant (kpsi) | 162 |
| flexural modulus, 1% Secant (kpsi) | 183 |
| flexural modulus, Chord (MPa) 2 mm/min | 1077 |
| Rockwell Hardness (R-Scale) | 67 |
| Heat Deflection Temperature at 66 psi (° C.) | 92 |

TABLE 3-continued

ICP and its Properties

| | Comparative Example 1 |
|---|---|
| Gloss | |
| at 60° | 31 |
| Impact | |
| notched Izod impact (ft-lb/in) | |
| at 23° C. | 3.0 |
| at −18° C. | 1.5 |
| notched Izod impact (kJ/m$^2$) | |
| at 23° C. | 13 |
| at −20° C. | 8.1 |
| at −40° C. | 6.7 |
| Notched Charpy Impact (kJ/m$^2$) | |
| at 23° C. | 13 |
| at −20° C. | 8.2 |
| at −40° C. | 6.4 |
| Gardner Impact Strength 0.125 in thick disk at −29° C. (in-lb) | 283 |
| Instrumented Impact (ft-lb) | |
| 6.6 m/s (15 mph/25 lb) at 23° C. | 26.2 (10D) |
| 6.6 m/s (15 mph/25 lb) at −20° C. | 27.6 (1D, 8DB, 1BD) |
| 6.6 m/s (15 mph/25 lb) at −30° C. | 28.2 (7DB, 3BD) |

Failure Modes
D: Ductile;
DB: Ductile-Brittle;
BD: Brittle-Ductile;
B: Brittle

TABLE 4

ICP and its Properties

| | Test Method | Example 6 | Comparative Example 2 |
|---|---|---|---|
| Resin Properties | | | |
| Melt Flow Rate (230° C./2.16 kg) | D 1238 | 30 | 30 |
| Ethylene-propylene copolymer (wt %) | EMCC | 22.8 | 23 |
| Ethylene in ethylene-propylene copolymer (wt %) | EMCC | 43.0 | 56 |
| IV ratio | EMCC | 2.9 | N/A |
| Mechanical | | | |
| tensile strength at yield (MPa) 50 mm/min | ISO 527 | 21 | 21 |
| Elongation at Yield (%) 50 mm/min | ISO 527 | 4.7 | 4.1 |
| Elongation at Break (%) 50 mm/min | ISO 527 | 28 | 30 |
| flexural modulus, Chord (MPa) 2 mm/min, 64 mm span | ISO 178 | 1115 | 1129 |
| Thermal | | | |
| Heat Deflection Temperature at 0.45 MPa flatwise (° C.) | ISO 75 | 86 | — |
| Heat Deflection Temperature at 1.8 MPa flatwise (° C.) | ISO 75 | 52 | 48 |
| Impact | | | |
| notched Izod impact (kJ/m$^2$) | ISO 180/A | | |
| at 23° C. | | 16.8 | 11 |
| at −30° C. | | 5.2 | — |
| at −40° C. | | 5.2 | 4.2 |
| Notched Charpy Impact (kJ/m$^2$) | ISO 179-1/1eA | | |
| at 23° C. | | 15.4 | 10.6 |
| at −30° C. | | 5.9 | — |
| at −40° C. | | 3.7 | 2.5 |
| Instrumented Impact (J) at 15 mph | ASTM D3763 | | |
| at 23° C. | | 19.9 (10D) | 20.3 (9D, 1DB) |
| at 0° C. | | 25 (10D) | 22.3 (3D, 1DB, 1BD, 5B) |
| at −15° C. | | 28.9 (7D, 3B) | — |
| at −20° C. | | 26.5 (5D, 1BD, 4B) | — |
| Shrinkage (%) | FHSOP-84 | | |
| 50% Pack Pressure | | 1.81 | 2.02 |
| 75% | | 1.63 | 1.82 |
| 100% | | 1.49 | 1.65 |

Failure Modes
D: Ductile;
DB: Ductile-Brittle;
BD: Brittle-Ductile;
B: Brittle

TABLE 5

Description of ICP Composition Components

| Ingredient | Description |
|---|---|
| basestock resin | Inventive ICP or Comparative Example ICP used in compounding formulations |
| PP7032E2 | Commercial ICP with MFR of 4.0 g/10 min, with an overall ethylene-propylene content of 18 wt %, and ethylene of the copolymer of 53 wt % (ExxonMobil Chemical Co.) |
| PP7905E1 | Commercial ICP with MFR of 100 g/10 min, with an overall ethylene-propylene content of 8.5 wt %, and ethylene content of the copolymer of 45 wt % (ExxonMobil Chemical Co.) |
| Engage ™ 8200 | Ethylene-Octene copolymer (Plastomer), Melt Index 5 g/10 min, density 0.87 g/cm$^3$ (DOW Chemical Co.) |
| Engage ™ 8842 | Ethylene-Octene copolymer (Plastomer), Melt Index 1 g/10 min, density 0.857 g/cm$^3$ (DOW Chemical Co.) |
| Jetfil ™ 700C | Talc supplied by Specialty Minerals Co. |
| IR-1010 (Irganox ™ 1010) | Primary anti-oxidant [Tetrakis(3-(3,5-di-tert butyl-4-hydroxyphenyl)propionate)] |
| IR-168 (Irgafos ™ 168) | Secondary anti-oxidant [Tris(2,4-di-tert butyl phenyl) phosphite] |
| Ampacet ™ 49974 | Carbon black masterbatch from Ampacet Co. |
| Kemamide ™ VO | Slip agent from Chemtura Chemicals Co. |
| Baerlocher ™ 8577 | Zinc stearate from Baerlocher |
| Atmer ™ 129 | Glycerol monostearate from Croda Chemical Co. |

TABLE 6

| Compositions of the ICP | | | |
|---|---|---|---|
| | Test Method | Example 7 | Comparative Example 3 |
| Composition Property | | | |
| Melt Flow Rate (230° C./2.16 kg) | | 31 | 31 |
| Ethylene-propylene copolymer (wt %) | | 26.1 | 26 |
| Ethylene in ethylene-propylene copolymer (wt %) | | 38.4 | 56 |
| IV Ratio | | 2.9 | 3.3 |
| Compound Formulation | | | |
| Basestock Resin | | 76.15% | 76.15% |
| PP7032E2 high-comonomer ICP | | 12% | 12% |
| Engage 8200 | | 10% | 10% |
| Jetfil 700C | | 1% | 1% |
| IR-1010 | | 0.10% | 0.10% |
| IR-168 | | 0.05% | 0.05% |
| Baerlocher 8577 (ZnSt) | | 0.05% | 0.05% |
| Ampacet 49974 (carbon black) | | 0.55% | 0.55% |
| Kemamide VO | | 0.10% | 0.10% |
| Compound Properties | | | |
| Total bi-polymer (Reactor made EPR + Plastomer) | | 32.0% | 31.9% |
| Melt Flow Rate (230° C./2.16 kg) | | 21 | 22 |
| Mechanical | | | |
| tensile strength at yield (MPa) 50 mm/min | ISO 527 | 19 | 19 |
| Elongation at Yield (%) 50 mm/min | ISO 527 | 6.1 | 4.4 |
| Elongation at Break (%) 50 mm/min | ISO 527 | 830 | 61 |
| flexural modulus, Chord (MPa), 2 mm/min, 64 mm span | ISO 178 | 950 | 1005 |
| Thermal | | | |
| Heat Deflection Temperature at 0.45 MPa flatwise (° C.) | ISO 75 | 76 | 80 |
| Impact | | | |
| notched Izod impact (kJ/m$^2$) | ISO 180/A | | |
| at 23° C. | | 52 | 52 |
| at 10° C. | | 50 | 16 |
| at −30° C. | | 9 | 7 |
| Instrumented Impact (J) at 5 mph | ASTM D3763 | | |
| at −30° C. | | 24 (10D) | 26 (9D, 1BD) |
| at −40° C. | | 28 (9D, 1BD) | 29 (3D, 1BD, 6B) |
| Instrumented Impact (J) at 15 mph | ASTM D3763 | | |
| at −20° C. | | 25 (10D) | 24 (7D, 3DB) |
| at −30° C. | | 23 (5D, 3BD, 2B) | 23 (10B) |
| Shrinkage, 2.8 mm thickness (%) | FHSOP-84 | | |
| Average 50%/75% Pack Pressure | | 1.23 | 1.48 |

Failure Modes
D: Ductile;
DB: Ductile-Brittle;
BD: Brittle-Ductile;
B: Brittle

TABLE 7

| | Test Method | Example 8 | Comparative Example 4 |
|---|---|---|---|
| Compositions of the ICP | | | |
| Composition Properties | | | |
| Melt Flow Rate (230° C./2.16 kg) | | 30 | 31 |
| Ethylene-propylene copolymer (wt %) | | 27.3 | 26 |
| Ethylene in ethylene-propylene copolymer (wt %) | | 42.9 | 56 |
| IV Ratio | | 3.2 | 3.3 |
| Compound Formulation | | | |
| Basestock Resin | | 93.0% | 91.5% |
| Engage 8200 | | 3.6% | 5.1% |
| Jetfil 700C | | 2.1% | 2.1% |
| IR-1010 | | 0.3% | 0.3% |
| IR-168 | | 0.1% | 0.1% |
| Ampacet 49974 (carbon black) | | 0.8% | 0.8% |
| Kemamide VO | | 0.1% | 0.1% |
| Compound Properties | | | |
| Total bi-polymer (Reactor made EPR + Plastomer) | | 29.0% | 28.9% |
| Melt Flow Rate (230° C./2.16 kg) | ISO 1133B | 27 | 32 |
| Mechanical | | | |
| tensile strength at yield (MPa) 50 mm/min | ISO 527 | 17 | 18 |
| Elongation at Yield (%) 50 mm/min | ISO 527 | 5.1 | 3.3 |
| Elongation at Break (%) 50 mm/min | ISO 527 | 76 | 14 |
| flexural modulus, Chord (MPa), 2 mm/min, 64 mm span | ISO 178 | 890 | 1061 |
| Flexural Strength, Chord (MPa), 2 mm/min, 64 mm span | ISO 178 | 22 | 25 |
| Thermal | | | |
| Heat Deflection Temperature at 0.45 MPa flatwise (° C.) | ISO 75 | 77 | 85 |
| Heat Deflection Temperature at 1.8 MPa flatwise (° C.) | ISO 75 | 48 | 51 |
| Impact | | | |
| notched Izod impact (kJ/m$^2$) | ISO 180-1/1eA | | |
| at 23° C. | | 50 | 14 |
| at −30° C. | | 6 | 6 |
| Instrumented Impact (J) at 15 mph | ASTM D3763 | | |
| at 0° C. | | 25 (10D) | 25 (4D, 3DB, 2BD, 1B) |
| at 10° C. | | — | 23 (7D, 3DB) |
| at −10° C. | | 26 (10D) | — |

Failure Modes
D: Ductile;
DB: Ductile-Brittle;
BD: Brittle-Ductile;
B: Brittle

TABLE 8

Compositions of the ICP

| | Test Method | Example 9 | Comparative Example 5 |
|---|---|---|---|
| Resin Properties | | | |
| Melt Flow Rate (230° C./2.16 kg) | | 30 | 31 |
| Ethylene-propylene copolymer (wt %) | | 27.3 | 26 |
| Ethylene in ethylene-propylene copolymer (wt %) | | 42.9 | 56 |
| IV Ratio | | 3.2 | 3.3 |
| Compound Formulation | | | |
| Basestock Resin | | 35.7% | 35.2% |
| PP7905E1 high-comonomer ICP | | 29.7% | 29.7% |
| Engage 8842 | | 16.5% | 17.0% |
| Jetfil 700C | | 16.5% | 16.5% |
| IR-1010 | | 0.3% | 0.3% |
| IR-168 | | 0.1% | 0.1% |
| Ampacet 49974 (carbon black) | | 0.8% | 0.8% |
| Atmer 129 | | 0.1% | 0.1% |
| Kemamide VO | | 0.3% | 0.3% |
| Compound Properties | | | |
| Total bi-polymer (Reactor made EPR + Plastomer) | | 28.8% | 28.7% |
| Melt Flow Rate (230° C./2.16 kg) | ISO 1133B | 30 | 30 |
| Mechanical | | | |
| tensile strength at yield (MPa) 50 mm/min | ISO 527 | 18 | 18 |
| Elongation at Yield (%) 50 mm/min | ISO 527 | 4.3 | 3.4 |
| Elongation at Break (%) 50 mm/min | ISO 527 | 105 | 44 |
| flexural modulus, Chord (MPa) 2 mm/min, 64 mm span | ISO 178 | 1579 | 1698 |
| Flexural Strength, Chord (MPa) 2 mm/min, 64 mm span | ISO 178 | 25 | 27 |
| Thermal | | | |
| Heat Deflection Temperature at 0.45 MPa flatwise (° C.) | ISO 75 | 102 | 102 |
| Heat Deflection Temperature at 1.8 MPa flatwise (° C.) | ISO 75 | 55 | 53 |
| Impact | | | |
| notched Izod impact (kJ/m$^2$) | ISO 180-1/1eA | | |
| at 23° C. | | 55 | 35 |
| at −30° C. | | 7 | 7 |
| Instrumented Impact (J) at 5 mph | ASTM D3763 | | |
| at −20° C. | | — | 27 (8D, 2DB) |
| at −30° C. | | 30 (9D, 1B) | 29 (1D, 4DB, 3BD, 2B) |
| at −40° C. | | 31 (6D, 1DB, 2BD, 2B) | — |

The inventive ICP allows an expanded ICP product design space, due to the lower ethylene in the ethylene-propylene copolymer or rubber phase while subsequently not fouling commercial process equipment. Thus, relative to the Comparative Examples (below), this allows a lower ICP copolymer (EPR proportion in the ICP) content or a higher final ICP MFR to achieve the same impact strength as the Comparative Examples (see FIG. 1). Per FIG. 1, at 30 g/10 min MFR of ICP, to maintain the No Break room temperature (at 23° C.) notched Izod (RTNI) property, one can achieve this at 31 wt % copolymer at 56 wt % ethylene-in-copolymer OR at 26 wt % copolymer at 42 wt % ethylene-in-copolymer or at 21 wt % copolymer at 36 wt % ethylene-in-copolymer.

Figure 2:
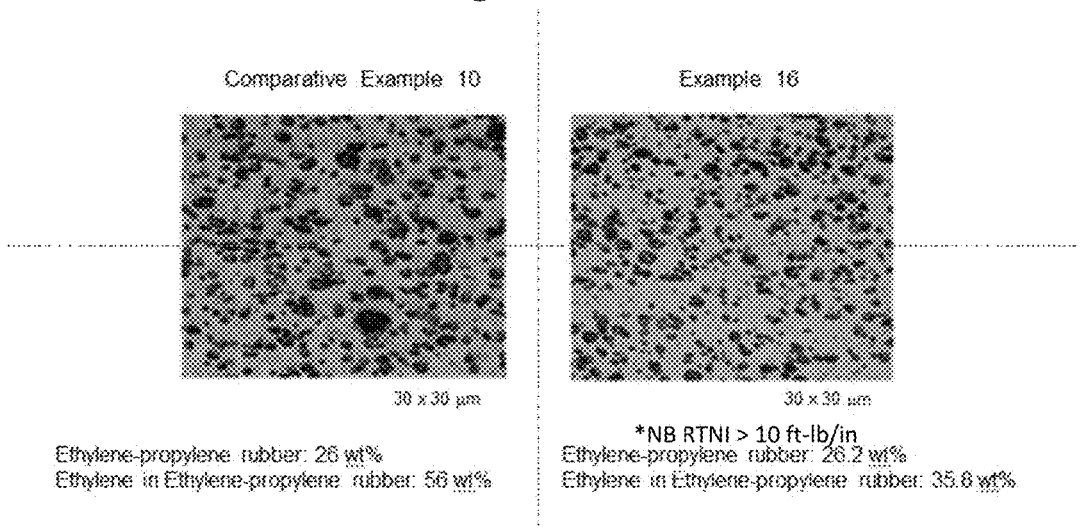
FIG. 2: AFM micrograph comparison of the effect of lowering ICP ethylene-in-copolymer content of example 16 and comparative example 10, both on the same scale.

The Comparative Examples 1 is a commercial ICP sample, with a target MFR of 30 g/10 min and EP copolymer content of 26 wt % and an ethylene in the EP copolymer of greater than 50 wt %. In the Examples 1-6, the inventive examples, have the same MFR and EP copolymer content as a Comparative Example 1, except the ethylene content in the EP copolymer was lowered to equal or below 45 wt %. Due to this change in the composition of the EP copolymer phase, the physical properties such as elongation at break, Izod and Charpy impact strength were significantly improved with minimal loss in flexural modulus and tensile at yield. The lower ethylene in the EP copolymer helps the elastomer phase disperse better in comparison to the Comparative Example 1, as evidenced in the micrographs of FIG. 2 below.

The Comparative Example 2 is a commercial ICP, with a target MFR of 30 g/10 min and EP copolymer content of 23 wt % and an ethylene in the EP copolymer of 56 wt %. The comparative ICP is made using control rheology, or viscosity breaking by peroxide, method from MFR of 16 g/10 min in order to enhance the impact strength. ICP products made using control rheology method is undesirable due to the generation of higher level of volatile organic compounds and color formation. In the Example 6, the inventive example was made without using controlled rheology methods (peroxide visbreaking), and has the same MFR and EP copolymer content as a Comparative Example 2, except the ethylene content in the EP copolymer was lower. Due to this change in the composition of the EP copolymer phase, the physical properties such as elongation at break, Izod and Charpy impact strength were significantly improved with minimal loss in flexural modulus. The notched Izod impact strength as measured at 23° C. for Example 6 was 16.8 kJ/m$^2$, while for the Comparative Example 2 it was only 11 kJ/m$^2$. In addition, the Instrumented Impact test at 15 mph shows the failure mode at 0° C. to be 100% ductile in comparison to 30% ductile for Comparative Example 2. Similar differences are observed at other temperatures and at 5 mph test speed. In addition, the mold shrinkage for Example 8 were lower in comparison to the Comparative Example 5, at average back pressures of 50/75/100%.

The inventive ICP samples were compounded into thermoplastic polyolefin compositions in Examples 7-9 and compared to the Comparative Examples 3-5 compositions comprising the Comparative Example 1 commercial ICP. The improvement on physical properties such as elongation at break, Izod impact strength, and cold temperature instrumented impact ductility observed on the base ICP were translated to the compounded TPO compositions.

Further analysis was performed on the inventive ICP by Gel Permeation Chromatography. In particular, the xylene cold soluble fraction (CSF), or the ethylene-propylene copolymer (propylene copolymer) portion was isolated and analyzed by SEC. The xylene CSF, which in the case of the inventive ICP will correspond to the propylene copolymer (ethylene-propylene copolymer), was determined by solubility in xylene at 135° C. The procedure was as follows: 2 grams of sample (either in pellet or ground pellet form) were added to 300 ml conical flask, followed by addition of 200 ml of xylene into the conical flask with stir bar and secure the flask on a heating oil bath. The oil bath was heated to allow melting of the polymer by leaving the flask in oil bath at 135° C. for about 15 minutes. Once the polymer dissolved, heating was discontinued but stirring continued through the cooling process. The dissolved polymer was allowed to cool overnight. The precipitate was filtered with Teflon filter paper and then dried under vacuum at 90° C. Finally, the xylene soluble fraction was calculated by taking the percent by weight of total polymer sample (A) less precipitate (B) at room temperature [soluble content=((A−B)/A)×100].

The procedure of ISO 16014-1(4): 2003 was followed to measure the Mn, Mw and Mz of the inventive ICP having an ethylene-propylene copolymer content of 29 wt % based on the weight of the ICP, and the ethylene-propylene copolymer having an ethylene content of 35 wt %, based on the weight of the copolymer. A Waters Alliance gel permeation chromatography (GPC) 2000 DRI instrument, equipped with refractive index detector and online viscometer was used with three TSK-gel columns (GM-HXL-HT) and 1,2,4-trichlorobenzene (TCB, stabilized with 200 mg/L 2,6-di-tert-butyl-4-methyl-phenol) as solvent at 145° C. and at a constant flow rate of 1 mL/min. An amount of about 200 μL of sample solution was injected per analysis. The column was calibrated using a relative calibration with 19 narrow MWD polystyrene (PS) standards in the range of 0.5 kg/mol to 11,500 kg/mol and a set of well characterized broad polypropylene standards. All samples were prepared by dissolving 5 to 10 mg of ICP in 10 mL (at 160° C.) of stabilized TCB (same as mobile phase) and keeping for 3 hours with continuous shaking prior sampling in the GPC instrument. The results are in Table 9, which are an average of three measurements of the ICP.

TABLE 9

SEC measurements of xylene cold soluble fraction

| Parameter | GPC DRI measurement |
| --- | --- |
| Mn | 70,000 g/mole |
| Mw | 254,800 g/mole |
| Mz | 609,000 g/mole |
| Mz/Mw | 2.39 (±0.04) |
| Mz/Mn | 8.7 (±0.3) |

Additional polymerizations were conducted to make a high gloss impact copolymer (G-ICP) similar to those produced above having high toughness (T-ICP), characterized in having a lower amount of propylene copolymer phase. The methods and process for making the G-ICP are similar to that for making the T-ICP, except the residence time in the gas phase reactor to produce the propylene copolymer was shorter, less ethylene was added to the reactor relative to propylene, and an increased amount of hydrogen was added to the gas phase reactor. Also, Atmer 163 was added to the gas phase reactor to reduce fouling. The catalyst was a Ziegler-Natta catalyst THC-136 (Toho Titanium, Japan), using propyltriethoxysilane and dicyclopentyldimethoxysilane as external donors. The process features are described in more detail in Table 10. The product characteristics are as outlined in Table 11, and its physical properties outlined in Table 12, including the amounts of the propylene copolymer (an ethylene-propylene copolymer, or "EP") and the polypropylene homopolymer, or "hPP"). Table 13 presents a summary of desirable characteristic ranges for the inventive ICP's compared to a commercial ICP from ExxonMobil Chemical Company.

TABLE 10

Process conditions for production of "glossy" impact copolymers (G-ICP) compared to the "tough" impact copolymers (T-ICP)

| Parameter | T-ICP | G-ICP |
| --- | --- | --- |
| Catalyst | | |
| Catalyst | THC-136 | THC-136 |
| Donors (wppm in propylene) | 25-37 | 25-37 |
| TEAL (wppm in propylene) | 70 | 70 |
| Slurry Loop Reactors | | |
| 1st Loop Rx H$_2$ Feed (ppm) | 5300 | 1350 |
| 2nd Loop Rx H$_2$ Feed (ppm) | 3200 | 1250 |
| 1st Loop Slurry Concentration (%) | 30-36 | 40 |
| 2nd Loop Slurry Concentration (%) | 28-36 | 40 |
| 1st Loop Rx Temperature (° C.) | 63-70 | 72-78 |
| 2nd Loop Rx Temperature (° C.) | 63-70 | 72-78 |
| Gas Phase Reactor | | |
| Atmer 163 (wppm) | 95-135 | 95-135 |
| Gas velocity (ft/s) | 2.0 | 2.0 |
| Rx vapor temperature (° C.) | 85 | 85 |
| H$_2$/Monomer ratio (mol %) | 1.3 | 0.85 |
| Pressure (kPa) | 1370 | 1370 |

TABLE 10-continued

Process conditions for production of "glossy" impact copolymers (G-ICP) compared to the "tough" impact copolymers (T-ICP)

| Parameter | T-ICP | G-ICP |
|---|---|---|
| C2/(C2 + C3) gas ratio | 0.19 | 0.21 |
| Total EP copolymer, wt % | 25-29 | 9-12 |
| Total C2 content, wt % | 8-11 | 2.9-4.6 |
| Neat oxygen flow (g/hr) | >4.0 | 20 |
| oxygen in N2/O2 (mppm) | 1000 | 1500 |

TABLE 11

Characterization of the "glossy" impact copolymers (G-ICP) compared to the "tough" impact copolymers (T-ICP)

| Property | T-ICP | G-ICP |
|---|---|---|
| MFR, g/10 min | 32.5 | 11.5 |
| propylene copolymer, wt % | 26.2 | 10.4 |
| Ethylene content of propylene copolymer content, wt % | 36.3 | 34.4 |
| Total C2 content, wt % | 9.51 | 3.6 |
| ICP melting temperature, ° C. | 165 | 165 |
| ICP crystallization temperature, ° C. | 134 | 128 |
| hPP MFR, g/10 min | 149 | 15.2 |
| Propylene copolymer MFR, g/10 min | 0.72 | 0.57 |
| hPP MFR/EP MFR | 207 | 26.7 |
| hPP IV, dL/g | 1.0 | 1.8 |
| Propylene copolymer IV, dL/g | 2.8 | 2.9 |
| hPP IV/EP IV | 0.4 | 0.6 |
| Propylene copolymer IV/hPP IV | 2.7 | 1.7 |
| ICP Mn, g/mol | 20,238 | 49,109 |
| ICP Mw, g/mol | 127,449 | 268,122 |
| ICP Mz, g/mol | 436,885 | 908,443 |
| ICP Mw/Mn | 6.3 | 5.5 |
| ICP PI (per rheology) | 4.6 | 4.5 |
| hPP Mn, g/mol | 25,516 | 52,242 |
| hPP Mw, g/mol | 136,843 | 243,037 |
| hPP Mz, g/mol | 396,039 | 751,637 |
| hPP Mw/Mn | 5.4 | 4.7 |
| hPP PI (per rheology) | 4.2 | 4.6 |
| Propylene copolymer particle size | <5 μm | <5 μm |
| Propylene copolymer Mw/hPP Mw | 1.86 | 1.34 |
| Propylene copolymer Mw/Mn | 3.4 | 3.1 |
| hPP Isopentad, % | 97.5 | 95.5 |

TABLE 12

Mechanical Properties of the "glossy" impact copolymers (G-ICP) compared to the "tough" impact copolymers (T-ICP)

| Resin Properties | Test Method | T-ICP | G-ICP |
|---|---|---|---|
| Melt Flow Rate (230° C./2.16 kg) g/10 min | D 1238 | 32 | 11 |
| amount of propylene copolymer, wt % | | 26.2 | 10.4 |
| amount of ethylene in the propylene copolymer, wt % | | 35.3 | 34.4 |
| IV propylene copolymer, dL/g | | 3.0 | 1.8 |
| polypropylene homopolymer MFR/IV | | 145/1.0 | 15.2/1.8 |
| Propylene copolymer MFR/IV | | 0.71/2.8 | 0.57/2.9 |
| ICP Mechanical Properties | | | |
| Tensile Stress @ Yield (MPa) 50 mm/min | ISO 527 | 20 | 31 |
| Elongation @ Yield (%) 50 mm/min | ISO 527 | 5.4 | 5.8 |
| Nominal Strain @ Break (%) 50 mm/min | ISO 527 | 98 | 64 |
| flexural modulus, Chord (MPa) 2 mm/min | ISO 178 | 1043 | 1680 |
| Heat Deflection Temperature, flatwise @ 0.45 MPa (° C.) | ISO 75 | 86 | 102 |
| Heat Deflection Temperature, flatwise @ 1.8 MPa (° C.) | ISO 75 | 48 | 54 |
| Tensile Stress @ Yield (psi) 2 in/min | D 638 | 2981 | 4762 |
| Elongation @ Yield (%) | D 638 | 6.0 | 6.4 |

TABLE 12-continued

Mechanical Properties of the "glossy" impact copolymers (G-ICP) compared to the "tough" impact copolymers (T-ICP)

| Resin Properties | Test Method | T-ICP | G-ICP |
|---|---|---|---|
| Nominal Strain @ Break (%) | D 638 | 70 | 124 |
| flexural modulus, 1% Secant (kpsi) | D 790A | 150 | 228 |
| flexural modulus, 1% Secant (kpsi) | D 790B | 170 | 260 |
| Rockwell Hardness (R-Scale) | D 785 | 69 | 96 |
| Heat Deflection Temperature @ 66 psi (° C.) | D 648 | 96 | 116 |
| Heat Deflection Temperature @ 264 psi (° C.) | D 648 | 50 | 124 |
| Gloss | D 523 | | |
| @ 20° | | — | 82 |
| @ 60° | | — | 89 |
| @ 85° | | — | 99 |
| Impact | | | |
| notched Izod impact (kJ/m$^2$) | ISO 180/A | | |
| @ 23° C. | | 46 | 6.9 |
| @ −20° C. | | 7.7 | 2.7 |
| @ −30° C. | | 7.0 | 2.5 |
| @ −40° C. | | 5.3 | 2.3 |
| Notched Charpy Impact (kJ/m$^2$) | ISO 179-1/1eA | | |
| @ 23° C. | | 50 | 6.8 |
| @ −20° C. | | 7.5 | 2.5 |
| @ −30° C. | | 6.9 | 2.4 |
| @ −40° C. | | 4.3 | 2.2 |
| notched Izod impact (ft-lb/in) | D 256A | | |
| @ 23° C. | | 12.0 | 1.6 |
| @ −18° C. | | 1.8 | 0.5 |
| Gardner Impact Strength 0.125 in thick disk @ −29° C. (in-lb) | D 5420 | 304 | 56 |

TABLE 13

Summary of preferred property ranges for the "glossy" ICP and "tough" ICP, with ExxonMobil commercial ICP for comparison.

| property | T-ICP | ExxonMobil AP3N | G-ICP |
|---|---|---|---|
| MFC, g/10 min | 26-35 | 8-12 | 9-13 |
| Amount of copolymer, wt % | 25-29 | 12-15 | 9-12 |
| Amount of ethylene in copolymer, wt % | 32-38 | 51-61 | 32-38 |
| hPP MFR, g/10 min | 120-170 | 15-23 | 12-20 |
| hPP IV, dL/g | 1-1.2 | 1.4-2 | 1.4-2.2 |
| EPR IV, dL/g | 2.4-3.4 | 3.2-5.2 | 2.4-3.4 |
| EPR IV/hPP IV | 2.4-3.8 | 2-3.2 | 1.2-2 |

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. An impact copolymer (ICP) comprising:
a polypropylene homopolymer having a molecular weight distribution (Mw/Mn) within a range of from 3.0 to 9.0, and
within a range of from 6 wt % to 20 wt % of a propylene copolymer based on the weight of the ICP, the propylene copolymer component having an Mz/Mw of less than 4, wherein the propylene copolymer comprises from 20 wt % to 44 wt % ethylene and/or C4 to C10 α-olefin derived units and the remainder propylene-derived units based on the weight of the propylene copolymer,
the impact copolymer having an MFR (230° C./2.16 kg) within a range of from 5 g/10 min to 50 g/10 min.

2. The impact copolymer of claim 1, wherein the polypropylene homopolymer forms a continuous phase and the propylene copolymer forms domains having an average size of less than 10 μm.

3. The impact copolymer of claim 1, having an average particle size within a range of from 1200 μm to 2800 μm.

4. The impact copolymer of claim 1, produced by contacting monomers and a magnesium chloride supported titanium catalyst with one or more external donors.

5. The impact copolymer of claim 1, having a HDT of greater than 100° C. at 66 psi.

6. The impact copolymer of claim 1, having a flexural modulus (1% Secant, ASTM D 790A) of greater than 200 kpsi.

7. The impact copolymer of claim 1, having a tensile strength at yield is within a range of from 2500 psi to 5500 psi.

8. The impact copolymer of claim 1, wherein the polypropylene homopolymer has a molecular weight distribution (Mw/Mn) within a range of from 3.5 to 9.0.

9. The impact copolymer of claim 1, wherein the propylene copolymer has a Mw/Mn within a range of from 3.0 to 9.0.

10. The impact copolymer of claim 1, having an Mw/Mn within a range from 4 to 8.

11. The impact copolymer of claim 1, wherein the propylene copolymer is an ethylene-propylene copolymer.

12. The impact copolymer of claim 1, wherein the polypropylene homopolymer has an MFR within a range from 5 to 40 g/10 min.

13. The impact copolymer of claim 1, wherein the propylene copolymer is a single-reactor produced copolymer.

14. The impact copolymer of claim 1, produced in a series reactor process wherein the polypropylene homopolymer is made in one or more reactors in series, followed by production of the propylene copolymer in the presence of the polypropylene homopolymer in a single-reactor.

15. The impact copolymer of claim 1, having a gloss at 60° of greater than 70%.

16. An appliance component comprising the impact copolymer of claim 1.

17. An impact copolymer (ICP) comprising:
a polypropylene homopolymer, and
within a range of from 6 wt % to 20 wt % of a propylene copolymer based on the weight of the ICP, wherein the propylene copolymer comprises from 20 wt % to 44 wt % ethylene and/or C4 to C10 α-olefin derived units and the remainder propylene-derived units based on the weight of the propylene copolymer,
the impact copolymer having an MFR (230° C./2.16 kg) within a range of from 5 g/10 min to 50 g/10 min;
wherein the polypropylene homopolymer forms a continuous phase and the propylene copolymer forms domains having an average size of less than 10 μm.

18. The impact copolymer of claim 17, having an average particle size within a range of from 1200 μm to 2800 μm.

19. The impact copolymer of claim 17, produced by contacting monomers and a magnesium chloride supported titanium catalyst with one or more external donors.

20. The impact copolymer of claim 17, having a HDT of greater than 100° C. at 66 psi.

21. The impact copolymer of claim 17, having a flexural modulus (1% Secant, ASTM D 790A) of greater than 200 kpsi.

22. The impact copolymer of claim 17, having a tensile strength at yield is within a range of from 2500 psi to 5500 psi.

23. The impact copolymer of claim 17, wherein the polypropylene homopolymer has a molecular weight distribution (Mw/Mn) within a range of from 3.0 to 9.0.

24. The impact copolymer of claim 17, wherein the propylene copolymer has a Mw/Mn within a range of from 3.0 to 9.0.

25. The impact copolymer of claim 17, wherein the propylene copolymer component has an Mz/Mw of less than 4.

26. The impact copolymer of claim 17, having an Mw/Mn within a range from 4 to 8.

27. The impact copolymer of claim 17, wherein the propylene copolymer is an ethylene-propylene copolymer.

28. The impact copolymer of claim 17, wherein the polypropylene homopolymer has an MFR within a range from 5 to 40 g/10 min.

29. The impact copolymer of claim 17, wherein the propylene copolymer is a single-reactor produced copolymer.

30. The impact copolymer of claim 17, produced in a series reactor process wherein the polypropylene homopolymer is made in one or more reactors in series, followed by production of the propylene copolymer in the presence of the polypropylene homopolymer in a single-reactor.

31. The impact copolymer of claim 17, having a gloss at 60° of greater than 70%.

32. An appliance component comprising the impact copolymer of claim 17.

33. An impact copolymer (ICP) comprising:
a polypropylene homopolymer having a molecular weight distribution (Mw/Mn) within a range of from 3.0 to 9.0 and an MFR within a range from 5 to 40 g/10 min, and
within a range of from 6 wt % to 20 wt % of a propylene copolymer based on the weight of the ICP, wherein the propylene copolymer comprises from 20 wt % to 44 wt % ethylene and/or C4 to C10 α-olefin derived units and the remainder propylene-derived units based on the weight of the propylene copolymer,
the impact copolymer having an MFR (230° C./2.16 kg) within a range of from 5 g/10 min to 50 g/10 min.

* * * * *